United States Patent [19]

Gast et al.

[11] Patent Number: 5,786,033
[45] Date of Patent: Jul. 28, 1998

[54] METHOD OF FORMING MULTI-LAYER PAINT FILMS, BASE COAT COMPOSITION AND METHOD OF PAINTING

[75] Inventors: Achim Gast, Sendenhorst, Germany; Kazuki Shiomi, Atsugi, Japan; Hitoshi Taniguchi, Bloomfield, Mich.

[73] Assignee: BASF Lacke + Farben, AG, Muenster-Hiltrup, Germany

[21] Appl. No.: 765,424

[22] PCT Filed: Jun. 23, 1995

[86] PCT No.: PCT/EP95/02454

§ 371 Date: Feb. 6, 1997

§ 102(e) Date: Feb. 6, 1997

[87] PCT Pub. No.: WO96/00757

PCT Pub. Date: Jan. 11, 1996

[30] Foreign Application Priority Data

Jun. 29, 1994 [JP] Japan ................. 6-148130

[51] Int. Cl.$^6$ ................................. B05D 1/36
[52] U.S. Cl. ............... 427/412.1; 524/591; 525/127; 525/131; 525/440; 525/454; 525/460
[58] Field of Search ................. 427/407.1, 409, 427/412.1; 524/591; 525/127, 131, 440, 453, 454, 460

[56] References Cited

U.S. PATENT DOCUMENTS

| | | | |
|---|---|---|---|
| 4,489,135 | 12/1984 | Drexler et al. | 427/409 |
| 4,719,132 | 1/1988 | Porter, Jr. | 427/409 |

FOREIGN PATENT DOCUMENTS

| | | |
|---|---|---|
| 0 089 497 A2 | 2/1983 | European Pat. Off. |
| 0 228 003 a1 | 12/1986 | European Pat. Off. |
| WO92/15405 | 9/1992 | European Pat. Off. |

*Primary Examiner*—Erma Cameron

[57] ABSTRACT

To form multi-layer paint films which have a good finished appearance on objects which are to be painted, using an aqueous base coat composition. An aqueous base coat composition which contains aqueous polyurethane resin and rheology control agent, the electrical conductivity measured in an aqueous solution of 3% by weight concentration of which is 700–900 mS/cm. is painted and then the paint film is formed, a transparent top coat is painted on the base coat paint film obtained in this way, and the base coat and the top coat are baked at the same time.

22 Claims, No Drawings

METHOD OF FORMING MULTI-LAYER PAINT FILMS, BASE COAT COMPOSITION AND METHOD OF PAINTING

INDUSTRIAL FIELD OF APPLICATION

This invention concerns a method of forming multi-layer paint films, base coat compositions and a method of painting and, more precisely, it concerns a method of forming multi-layer paint films with which a good finished appearance can be obtained, aqueous base coat compositions which have excellent storage stability and with which paint films which have a good finished appearance can be obtained, and a method of painting therewith.

PRIOR ART

In general, a series of paints are painted onto the base when painting automobiles. The first coat is an electrodeposited primer and, after this, a mid-coat paint is painted on and then the base coat for the overcoat paint is painted on over this and finally a clear coat is painted on as a top coat. The base coat is the one which imparts good decoration to the final finish by means of a organic pigment or inorganic pigment, and a metallic finish is desirable for the finish of many automobiles. A metallic pigment, such as aluminium flakes for example, is generally compounded in the base coat in order to obtain the metallic effect.

Paint film formation of the base coat and the clear coat (top coat) is normally achieved by wet-on-wet painting, which is to say that the clear coat is painted on without baking after painting on the base coat and then flashing off (drying) for a short period of time at room temperature, and subsequently baking and drying the base coat and clear coat at the same time.

Large amounts of organic solvent are included in the paints, and especially the base coat paints, for automobile purposes which are on the market at the present time. However, concern over the volatile organic solvents which are released into the atmosphere is increasing, and much effort is being directed towards the research and development of aqueous paints which contain water in the main as the solvent and in which the amount of organic solvent is small.

The orientation of the metallic pigment flakes in the paint film contributes to the metallic effect. Hence, in order to obtain a metallic effect with a base coat, the metal pigment flakes which are present in the base coat must be orientated appropriately after painting. They have to be immobilized immediately, and care must be taken to ensure that they are not disturbed in the next process, namely clear coat painting.

Difficult problems arise as a result of the physical properties of water when developing water based paints which have a metallic effect. At the present time, compositions which can be used as water based base coats are limited from the viewpoint of orientation as mentioned above. Water based paints which have a metallic effect have been disclosed, for example, in European Patents EP-A-89497, EP-A-355433 and EP-A-521919, German Patents DE-OS-3545618, DE-OS-3903804 and DE-OS-4107136, and U.S. Pat. No. 4,719,132.

The use of base coats in which silica thickeners which have thixotropic properties are compounded in multi-layer film formation is disclosed in the abovementioned patents, and painting with a view to providing beauty and protection is carried out by forming a base coat/clear coat type multi-layer film on the base material using base coats of this type.

However, with base coats which contain silica such as those indicated above, the storage stability of the paint at high temperature is poor and there is a difficulty in that a good paint film finished appearance cannot be obtained.

Furthermore, an aqueous paint composition wherein an aqueous polyurethane resin and various silica based thickeners are combined has been disclosed in the abovementioned European Patent EP-A-89497. However, in this patent there is no indication at all as to the type of silica based thickener which is used, or the electrical conductivity of the thickener.

Furthermore, the combination of sodium magnesium silicate and acrylic copolymer based thickener and/or other synthetic resin based thickener and/or auxiliary thickener (associative thickener) has been disclosed in German Patent DE-A-4110520, but similarly there is no disclosure concerning electrical conductivity.

PROBLEMS TO BE RESOLVED BY THE INVENTION

The aim of this present invention is to propose a method of forming multi-layer paint films with which paint films which have a good finished appearance can be obtained using an aqueous base coat composition.

A further aim of the invention is to provide an aqueous base coat paint which has excellent storage stability and with which paint films which have a good finished appearance can be formed, and a method of painting therewith.

MEANS OF RESOLVING THESE PROBLEMS

The present invention is a method of forming multi-layer paint films, a base coat composition and a method of painting as indicated below.

(1) Method of forming multi-layer paint films wherein a multi-layer paint film is formed on an object which is to be painted with a view to providing protection and/or beauty, characterized in that:

1) a base coat composition which is aqueous and which contains pigment is painted on as a base coat;

2) a paint film of the composition which has been painted on in 1) is then formed;

3) a transparent top coat is painted on the base coat paint film which has been obtained in this way; and 4) the base coat and the top coat are baked at the same time.

(2) Base coat composition comprising an aqueous dispersion for forming a multi-layer paint film on an object which is to be painted with a view to providing protection and/or beauty, characterized in that it comprises a polyurethane dispersion wherein an aqueous polyurethane resin which has structural units represented by the general formula (1) indicated below is dispersed in water.

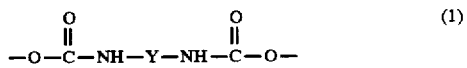

(In this formula, Y represents an aromatic, aliphatic or alicyclic hydrocarbyl group.)

(3) Base coat composition, according to (2) above, characterized in that 1–80% by weight of aqueous melamine resin is included with respect to the solid fraction of the polyurethane dispersion.

(4) Base coat composition, according to (3) above, characterized in that it contains aqueous polyester resin and/or acrylic resin as a binder component, the [Melamine Resin]:[Polyester Resin and/or Acrylic Resin] ratio by weight is 2:1–1:4, and the total amount of melamine resin, polyester resin and acrylic resin is 1–80% by weight with respect to the solid fraction of the polyurethane dispersion.

(5) Base coat composition, according to any of (2)–(4) above, characterized in that a rheology control agent is included in an amount of 0–10% by weight, and preferably of 0.5–2% by weight, with respect to the base coat composition.

(6) Base coat composition, according to any of (2)–(5) above, characterized in that it contains a rheology control agent which exhibits a specified electrical conductivity.

(7) Base coat composition, according to any of (2)–(6) above, characterized in that it contains a rheology control agent of which a 3% aqueous solution exhibits an electrical conductivity of 700–900 mS/cm, and preferably of 700–780 mS/cm.

(8) Base coat composition, according to any of (2)–(7) above, characterized in that sodium magnesium silicate is included as a rheology control agent.

(9) Base coat composition, according to any of (2)–(8) above, characterized in that it contains 0.5–25 by weight of metallic pigment and/or effect pigment.

(10) Base coat composition, according to any of (2)–(9) above, characterized in that the pH value is 6–9, preferably 7.5–8.5, and most desirably 8.0–8.4.

(11) Method of painting a base coat composition as disclosed in any of (2)–(10) above which is used on an object which is to be painted.

(12) Method of painting a base coat composition as disclosed in any of (2)–(10) above which is used on plastic.

(13) Method of painting a base coat composition as disclosed in any of (2)–(10) above which is used for repainting purposes.

(14) Method of forming a multi-layer paint film, according to (1) above, characterized in that a base coat composition which contains 1–80% by weight of the aqueous melamine resin with respect to the solid fraction of the polyurethane dispersion is used.

(15) Method of forming a multi-layer paint film, according to (14) above, characterized in that a base cost composition which contains aqueous polyester resin and/or acrylic resin is included, of which the [Melamine Resin]/[Polyester Resin and/or Acrylic Resin] ratio by weight is 2:1–1:4, and in which the total amount of melamine resin, polyester resin and acrylic resin is 1–80% by weight with respect to the solid fraction of the polyurethane dispersion is used.

(16) Method of forming a multi-layer paint film, according to any of (1), (14) and (15) above, characterized in that a base coat composition which contains a rheology control agent in an amount of 0–10% by weight, and preferably of 0.5–2% by weight, with respect to the base coat composition is used.

(17) Method of forming a multi-layer paint film, according to any of (1), (14) and (15) above, characterized in that a base coat composition which contains a rheology control agent of which a 3% aqueous solution exhibits an electrical conductivity of 700–900 mS/cm, and preferably of 700–780 mS/cm, is used.

(18) Method of forming a multi-layer paint film, according to any of (1), (14) and (15) above, characterized in that a base coat composition which contains sodium magnesium silicate as a rheology control agent is used.

(19) Base coat composition, according to any of (2)–(10) above, wherein it is used in combination with an aqueous top coat or a powder top coat.

In the method of forming a multi-layer paint film of this present invention, a base coat composition which is aqueous and which contains pigment is first of all painted as a base coat onto the object which is to be painted. A base coat composition as disclosed in claims 2–10, and, among these, a base coat composition which contains a rheology control agent which exhibits a specified electrical conductivity, is preferred for the base coat composition which is used here, but it is not limited to these compositions. A paint film of the base coat composition is then formed by drying for a short period of time at from room temperature to about 80° C. Next, a transparent top coat is painted on to the base coat paint film without baking. The base coat and top coat are then baked at the same time and a multi-layer paint film is formed.

The aqueous polyurethane resin used in the invention is a resin which contains structural units which can be represented by the aforementioned general formula (1). Actual examples of structural units which are included in general formula (1) include the structural units represented by general formula (2) below.

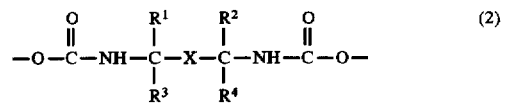

(In this formula, X represents an aromatic, aliphatic or alicyclic hydrocarbyl group, and $R^1$–$R^4$ represent alkyl groups of carbon number 1–4.)

Examples of alkyl groups of carbon number 1–4 which can be represented by $R^1$–$R^4$ in general formula (2) include the methyl, ethyl, n-propyl, isopropyl, n-butyl, iso-butyl, sec-butyl and tert-butyl groups. $R^1$–$R^4$ may all be the same, or some of them may be different, or all of them may be different.

The following groups can be cited as divalent aromatic hydrocarbyl groups which are shown as Y in general formula (1).

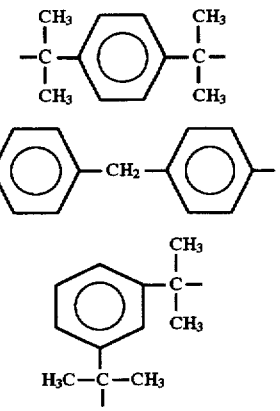

The dimethylene group, the tetramethylene group and the hexamethylene group can be cited, for example, as aliphatic hydrocarbyl groups which can be represented by Y.

The groups indicated below can be cited, for example, as alicyclic hydrocarbyl groups which can be represented by Y.

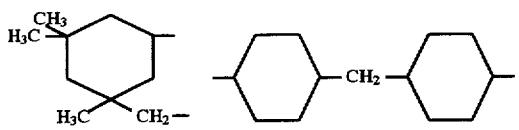

No particular limitation is imposed upon the proportion of structural units represented by the aforementioned general formula (1) in the aqueous polyurethane resin, but it is preferably 10–40% by weight. Furthermore, no particular limitation is imposed upon the molecular weight of the aqueous polyurethane resin, but it is preferably a number average molecular weight of at least 1000, more preferably at least 4000, and even more particularly preferably 5000–8000.

Salts can be formed by adding primary—tertiary organic amines, such as triethylamine, diethylethanolamine or N-methylmorpholine, or ammonia, to disperse the aqueous polyurethane resin in water, or an aqueous medium in which water is the principal component, and obtain an aqueous dispersion. A polyurethane dispersion is obtained in this way.

Aqueous polyurethane resins, or aqueous dispersions thereof, used in the invention have been disclosed, for example, in European Patents EP-A-89497 and EP-A-355433, German Patents DE-OS-3545618, DE-OS-3903804 and DE-OS-4107136, and U.S. Pat. No. 4,719,132.

The aqueous polyurethane resins used in the invention can be manufactured, for example, by polymerizing the components 1)–4) as indicated below.

1) Polyester polyol or polyether polyol, or a mixture of thereof. Those of these compounds of number average molecular weight 400–5000 are preferred.

2) Diisocyanate which can form structural units which can be represented by the aforementioned general formula (1) by reacting with hydroxy groups, or mixtures thereof. Actual examples include tetramethylxylene diisocyanate (m-TMXDI), 1,3-bis(2-isocyanatopropyl-2-yl)benzene), isophorone diisocyanate, hexamethylene diisocyanate, bis (isocyanatocyclohexyl)methane and 1,4-tetramethylene diisocyanate.

3) Compound which has 2 or more functional groups, such as hydroxy groups and/or amino groups, or a mixture thereof. Those of these compounds of number average molecular weight 60–400 are preferred. Actual examples include ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil, hydrogenated castor oil, ditrimethylolpropane ether, pentaerythritol, 1,2-cyclohexanediol, 1,4-cyclohexanedimethanol, bisphenol A, bisphenol F, neopentyl glycol, hydroxypivalic acid neopentyl glycol ester, hydroxyethylbisphenol A, hydroxypropylbisphenol A, hydrogenated bisphenol A, and mixtures thereof.

4) Compound which has just 1 functional group which reacts with isocyanate group in the molecule, or mixtures thereof. Actual examples include methanol, ethanol, propanol, butanol and pentanol.

A crosslinked structure is obtained when an aqueous melamine resin is compounded as a binder in addition to the aqueous polyurethane resin in a base coat composition of this present invention, and this is desirable since a paint film which has superior water resistance and physical resistance is obtained. Moreover, if the acrylic resin dispersions disclosed in German Patent DE-OS-4009857 and/or the aqueous polyester resins disclosed in European Patent EP-A-89497, German Patent DE-OS-3210051 or German Patent DE-OS-4107136, and/or polyether resins, are combined in addition to the aqueous melamine resin, the dispersibility of the pigment is improved and the smoothness of the paint surface is good, and so this is desirable.

The storage stability is especially good when a rheology control agent is compounded in a base coat composition of this present invention, and this is also desirable since it is possible to form paint films which have an especially good finished appearance. The rheology control agent is one of which the electrical conductivity, measured at a concentration of 3% by weight in aqueous solution, is 700–900 mS/cm, preferably 700–800 mS/cm, and most desirably 700–780 mS/cm. Here, a rheology control agent is one of those known in the past as a rheology control agent, thickener, thinner, thixotropic agent or anti-run agent for example, which has been compounded to thicken and stabilize the paint. The rheology control agents which have been used conventionally for water based paints can be used in this present invention. Examples include inorganic materials such as silicates, montmorillonite, organic montmorillonite and colloidal alumina; cellulose derivatives such as carboxymethylcellulose, methylcellulose and hydroxyethylcellulose; protein based materials such as casein, sodium caseinate and ammonium caseinate; alginic acid based material such as sodium alginate; polyvinyl based materials such as poly(vinyl alcohol), polyvinylpyrrolidone and poly(vinyl benzyl ether) copolymers; polyacrylic acid based materials such as poly(sodium acrylate) and poly(acrylic acid)—methacrylic acid ester copolymers; polyether based materials such as pluronic polyethers, polyetherdialkyl esters, polyetherdialkyl ethers, urethane modified polyethers and epoxy modified polyethers; and maleic acid anhydride copolymer systems such as partially esterified vinyl methyl ether—maleic anhydride copolymer. From among these the silicates, and especially sodium magnesium silicate, are preferred. Sodium magnesium silicate is generally called smectite clay or synthetic hectorite, and it is marketed by Laport, for example, under the trade name LAPONITE RD (sodium magnesium lithium silicate) and it is readily available commercially. Sodium magnesium silicate assumes a lower electrical conductivity on washing with water, even though the composition is the same, and an electrical conductivity in the abovementioned range can be achieved by controlling the extent of water washing.

The rheology control agent, for example sodium magnesium silicate, is preferably used as an aqueous paste. Most desirably, it is in the form of a 3% by weight sodium magnesium silicate solution in water together with 3% by weight of polypropylene glycol, a 2% by weight sodium magnesium silicate solution in water together with 0.6% by weight of polypropylene glycol, or a 2% by weight sodium magnesium silicate solution in water together with 2% by weight of other surfactant. The percentages by weight indicated above are values with respect to the total weight of the paste.

The rheology control agent, for example sodium magnesium silicate, can be used alone, or it can be used in combination with other ionic synthetic resin based thickeners and/or auxiliary thickeners (associate thickeners, for example OLEATE 205; trade name, manufactured by the Reokkusu Co., or BISUKAKAKKU HV30; trade name, manufactured by the Allied Colloid Co.).

The pigments and/or dyes which are used in the paint industry can be used in the base coat compositions of this present invention. Examples of pigments include metallic pigments, such as aluminium powder and aluminium paste for example; metal based effect pigments, such as titanium oxide, iron oxide and metal powders for example; non-metallic effect pigments, such as mica for example; carbon black and organic pigments. Metallic pigments which have been pre-treated so as to be suitable for aqueous paints can also be used. The metallic pigments can also be compounded in combination with the abovementioned non-metallic pigments and dyes.

The compounding proportions of each component are as follows. Thus, in those cases where an aqueous melamine resin is included, the amount included is 1–80% by weight, and preferably 20–60% by weight, with respect to the solid fraction of the polyurethane dispersion, and the remainder is preferably aqueous polyurethane resin. Moreover, in those cases where aqueous polyester resin and/or acrylic resin is included, the amounts included are such that the ratio by weight of [Melamine Resin]:[Polyester Resin and/or Acrylic Resin] is 2:1–1:4, and preferably 2:1.2–1:2, and the total amount of melamine resin and polyester resin and/or acrylic resin is 1–80% by weight, and preferably 20–60% by weight, with respect to the solid fraction of the polyurethane dispersion, and the remainder is preferably aqueous polyurethane resin. In those cases where a polyether resin is included, the ratio by weight of [Melamine Resin]:[Resin Selected from among the Group Comprising Polyester Resin, Acrylic Resin and Polyether Resin (referred to hereinafter as "polyester resin etc.")] is 2:1–1:4, and preferably 2:1.2 –1:2, and the total content of melamine resin and polyester resin etc. is 1–80% by weight, and preferably 20–60% by weight, with respect to the solid fraction of the polyurethane dispersion, and the remainder is preferably aqueous polyurethane resin.

In those cases where a rheology control agent is included, the amount included is 0–10% by weight, and preferably 0.5–2% by weight, with respect to the base coat composition, and the remainder is preferably water, solvent, aqueous polyurethane resin, melamine resin or polyester resin etc. for example. The amount of rheology control agent included with respect to the solid fraction of the base coat composition is preferably 0–20% by weight, and most desirably 2–80% by weight. That is to say, in those cases where no melamine resin or polyester resin etc. is included in the solid fraction, the amount of aqueous polyurethane resin included is preferably 80–100% by weight, and most desirably 90–98% by weight. In those cases where melamine resin and polyester resin etc. are included, the amount of aqueous polyurethane resin included is preferably 5–90% by weight, and most desirably 30–80% by weight, and the total amount of melamine resin and polyester resin etc. included is preferably 1–80% by weight, and most desirably 20–70% by weight.

The amount of metallic pigment and/or effect pigment included is preferably 0.5–25% by weight, and most desirably 3–24% by weight, with respect to the solid fraction of the binder.

In those cases where the compounding proportions of each of the abovementioned components are combined within the preferred ranges in all cases, it is possible to obtain a base coat composition which has excellent storage stability, with which paint films which have an excellent finished appearance and paint film performance can be formed, and with which the balance of these properties is very good, and if the amounts of certain components compounded are in the preferred range then a constant effect can be obtained even in those cases where the remaining components are compounded in amounts wider than the preferred ranges.

The base coat compositions of this present invention are aqueous base coat compositions comprising an aqueous dispersion in which the various components described so far are dispersed in a water based medium.

The solid fraction concentration of the base coat composition is preferably 15–50% by weight at the painting viscosity. The solid fraction concentration affects the base coat paint colour, and good paint colours are obtained with the abovementioned concentrations, but in the case of a base coat composition which has a metallic colour, a solid fraction concentration of 17–25% by weight is preferred since this gives an especially good paint colour, and in the case of a solid colour an especially good paint colour is obtained with a solid fraction concentration of 30–45% by weight and so this is preferred.

Water, or a medium in which a small amount of organic solvent is included in water, or the reaction liquid in which the aqueous polyurethane resin has been polymerized, for example, can be cited for the abovementioned water based medium. It is desirable that the amount of organic solvent included should be as small as possible, and it is preferably not more than 15% by weight for example.

The base coat compositions of this present invention can be obtained by dispersing the polyurethane resin etc. in the water based medium with the addition of a primary—tertiary organic amine, such as triethylamine, diethylethanolamine or N-methylmorpholine for example, or ammonia. In this case, methods in which the aqueous polyurethane resin is dispersed in the way mentioned above and other essential components are added to this polyurethane dispersion, for example, can be adopted. The pH of the aqueous dispersion obtained is 6–9, preferably 7.5–8.5, and most desirably 8–8.4.

Ultraviolet absorbers, photostabilizers, levelling agents, anti-foaming agents, plasticizers, pigment dispersants and hardening catalysts, for example, can be compounded in a base coat composition of this present invention, as required, within the ranges where they do not impede the purpose of the invention.

No particular limitation is imposed upon the material on which a base coat composition of this present invention is to be painted, and the material may be, for example, metal, plastic, wood or paper. From among these materials, metals, and especially steel sheet for automobile purposes, and plastics are preferred.

The base coat compositions of this present invention can be used not only for initial painting of an object which is to be painted as described above but also for repainting purposes.

Any solvent type, aqueous or powder transparent clear coat can be used for the top coat which is painted over a base coat composition of this present invention. These transparent clear coats may be clear coats which do not contain any pigment at all, or they may be transparent clear coats which contain a small amount of pigment.

The formation of the paint film is preferably the aforementioned method of forming a multi-layer paint film, with the clear coat being painted on with a so-called wet-on-wet procedure, but it is not limited to this method. For example, a multi-layer paint film can be formed by painting a base coat composition of this invention onto the aforementioned object which is to be painted, and forming a paint film of the base coat composition by drying for a short time at room temperature to about 80° C., for example for 5 minutes at 80° C., painting the aforementioned top coat onto this paint film without baking, and then baking the base coat and the top coat at the same time. The baking conditions differ according to the type of clear coat, but generally conditions of a temperature of 75°–170° C. and a time of 15–30 minutes are preferred. The film thickness of the dry base coat paint film is preferably 7–30 mm.

EFFECT OF THE INVENTION

It is possible to form multi-layer paint films which have a good finished appearance with the method of forming a multi-layer paint film of this present invention. In particular, it is possible to form multi-layer paint films which have an especially good finished appearance by using a base coat composition which contains the specified amount of a specified rheology control agent.

The base coat compositions of this present invention have excellent storage stability and can form paint films which have a good finished appearance. In particular, the base coat compositions which contain a specified amount of a specified rheology control agent have especially good storage stability and can form paint films which have an especially good finished appearance. Consequently, the base coat compositions of this present invention can be used advantageously with steel sheets or plastics, and especially with automobiles.

ILLUSTRATIVE EXAMPLES

Illustrative examples of the invention are described below. In these examples the term "parts" signifies "parts by weight" and the term "%" signifies "% by weight".

Example of Manufacture 1 (Manufacture of a Polyurethane Dispersion)

Polymer fatty acid (798 g) [this compound was a dimerized fatty acid, (trade name PREPOL 1009, manufactured by the Unichem International Co.) prepared from 1,6-hexanediol and maleic anhydride, average molecular weight 1400], 12.5 g of 1,6-hexanediol, 65 g of dimethylolpropionic acid and 529.5 g of methyl ethyl ketone were introduced into a four-necked flask which had been furnished with a stirrer, a thermometer, a reflux condenser and a nitrogen gas delivery tube and, after mixing, 329 g of 1,3-bis(2-isocyanatopropyl-2-yl)benzene [m-TMXDI, manufactured by the American Cyanamid Co.] were added.

Reaction was continued by maintaining at 82° C. with stirring and mixing until the free isocyanate group content reached 1% of the total amount introduced. Then, 31 g of trimethylolpropane were added and the mixture was maintained at 82° C. The rise in viscosity of the reaction mixture was checked and the reaction was continued until it reached 5 dpa*s (this required about 5 hours). The viscosity was measured at 23° C. by dissolving a 10 ml sample in 10 ml of N-methylpyrrolidone and then using a Corn Plate type viscometer.

Next, 54 g of butanol were added and the reaction was stopped. Moreover, a mixture of 38 g of dimethylethanolamine and 3254 g of deionized water was added and the mixture was stirred for about 2 hours, after which the methyl ethyl ketone was removed by distillation under reduced pressure. A polyurethane dispersion of solid fraction 31% was obtained in this way.

Example of Manufacture 2 (Manufacture of a Polyester Resin)

Neopentyl glycol (729%), 827% of hexanediol, 462% of hexahydrophthalic acid anhydride and 1710% of polymer fatty acid (dimer content at least 98%, trimer content at most 2%, trace monomer content) were introduced into a four necked flask which had been furnished with a water separator and the temperature was raised while stirring. At this time, care was taken to ensure that the temperature of the column attached to the water separator did not exceed 100° C. An esterification reaction was carried out at a maximum temperature of 220° C. and this was continued until the acid value reached 8.5. After cooling to 180° C., 768% of trimellitic acid anhydride was added and the esterification reaction was continued until the acid value reached 30.

Next, the reaction mixture was cooled to 120° C. and 1410% of butanol was added and dissolved. Moreover, after cooling to 90° C., 16.2% of dimethylethanolamine was added and then 1248% of deionized water was added. A polyester dispersion of pH 7.8, solid fraction 60% and acid value 30 was obtained in this way.

ILLUSTRATIVE EXAMPLE 1

1) Preparation of an Aqueous Base Coat Composition

An aqueous base coat composition was prepared in the following way in accordance with the example of manufacture disclosed in German Patent DE-OS-4107136.

First of all, 2.7% of butylcellosolve and 6.4% of commercial melamine resin solution (CYMEL 327, trade name, manufactured by the American Cyanamid Co., 90% isobutanol solution) were added with stirring to 34.3% of rheology control agent solution and dissolved. Next, 35.7% of the polyurethane dispersion obtained in Example of Manufacture 1 was added with stirring and a melamine resin—polyurethane resin mixture was obtained. A 3% aqueous solution of sodium magnesium silicate (LAPONITE RD, trade name, manufactured by the Laport Co.) was used for the abovementioned rheology control agent. The electrical conductivity of the rheology control agent aqueous solution was 886 mS/cm. A TOA CM-20S electrical conductivity meter (trade name, manufactured by the Toa Denpa Kogyo Co.) was used to measure the electrical conductivity.

A slurry of aluminium pigment was prepared in the following way in parallel with the procedure described above. A stable commercial aluminium paste (average particle size: 15 mm) (3.8%) was uniformly mixed together with 6.0% of butylcellosolve in water. The aforementioned polyester resin obtained in Example of Manufacture 2 (6.7%) was added to this mixture and stirred, and a slurry of aluminium pigment was obtained.

This slurry of aluminium pigment was added to the aforementioned melamine resin—polyurethane resin mixture and stirred. Finally, about 4.4% of deionized water was added, the pH was adjusted to the range 8.10–8.30 with dimethylethanolamine solution (10% deionized water solution) and an aqueous base coat composition was obtained.

2) Painting Tests

The aqueous base coat composition obtained in 1) above was adjusted to a solid fraction concentration of about 24.0% using deionized water in such a way as to provide a viscosity with which spray painting was possible. Next, a commercial electrodeposition paint and a mid-coat paint were painted onto a steel sheet which had been subjected to a phosphoric acid chemical forming treatment and a test sheet was obtained, and the aqueous base coat composition was painted onto the test sheet using an air spraying type painting machine in such a way as to provide a dry film thickness of 13–16 μm.

Next, this was dried for 10 minutes at 80° C. in a drying oven. Next, after painting with a commercial one-liquid type clear coat (acrylic resin/melamine resin type), it was baked for 25 minutes at 140° C. in a drying oven. The dried paint film thickness of the top coat clear was 40 μm. The finished appearance etc. of the paint film obtained were measured. The results are shown in Table 1.

3) Paint Storage Stability at High Temperature Tests

The aqueous base coat composition obtained in 1) above was stored for 1 month at 40° C. Subsequently, painting was carried out in the same way as in 2) above and a paint film was formed. The results are shown in Table 2.

ILLUSTRATIVE EXAMPLE 2

The same procedure as in Illustrative Example 1 was carried out except that a 3% aqueous solution of sodium magnesium silicate (Laponite RD, trade name, manufactured by the Laport Co.) which had been washed with water in such a way that the electrical conductivity in a 3% aqueous solution was 760 µS/cm was used for the rheology control agent solution in Illustrative Example 1. The results are shown in Table 1 and Table 2.

ILLUSTRATIVE EXAMPLE 3

The same procedure as in Illustrative Example 1 was carried out except that a 3% aqueous solution of sodium magnesium silicate (LAPONITE RD, trade name, manufactured by the Laport Co.) which had been washed with water in such a way that the electrical conductivity in a 3% aqueous solution was 1034 µS/cm was used for the rheology control agent solution in Illustrative Example 1. The results are shown in Table 1 and Table 2.

ILLUSTRATIVE EXAMPLE 4

The same procedure as in Illustrative Example 1 was carried out except that a 3% aqueous solution of sodium magnesium silicate (LAPONITE RD, trade name, manufactured by the Laport Co.) which had been washed with water in such a way that the electrical conductivity in a 3% aqueous solution was 572 µS/cm was used for the rheology control agent solution in Illustrative Example 1. The results are shown in Table 1 and Table 2.

TABLE 1

|  | Example 1 | Example 2 | Example 3 | Example 4 |
|---|---|---|---|---|
| MF-D Value*1 | 75.8 | 76.8 | 76.2 | 62.3 |
| IV Value*2 | 228 | 236 | 231 | 165 |
| Visual Appearance*3 | o | o | o | Δ-x |
| Run Properties*4 | o | o | o | x |
| Solid Fraction | 24.0% | 24.0% | 22.5% | 30.5% |
| Viscosity (DIN 4 cup) | 28– | 25– | 40– | 20– |

Notes on Table 1
*1 MF-D Value: The gloss at was measured at angles of 25° and 70° using a goniophotometer GP2 (manufactured by the Carl Zeiss Co.), and the MF-D value was calculated using the formula indicated below.
MF-D Value = {(L25°–L70°)/L70°} × 50
The MF-D value is a standard value for assessing the metallic effect of a base coat/clear coat paint film, and a higher numerical value indicates a better metallic effect.
*2 IV Value: This was measured using an LMR100 (trade name, manufactured by the Kansai Paint Co.). A higher numerical value indicates stronger metallic effect and a better finished appearance.
*3 Visual Appearance: The appearance of the paint film was evaluated according to the following standards:
x: Poor
Δ: Rather poor
o: Excellent
*4 Run Properties:
The extent of running (flow) on painting the base coat on a vertical part was evaluated according to the following standards:
x: Poor
Δ: Rather poor
o: Excellent As is clear from the results shown in Table 1, the run properties were poor in Illustrative Example 4 and so a poor result was also obtained for the finished appearance. This was because a sodium magnesium silicate which had too low an electrical conductivity had been used for the rheology control agent. The paste viscosity of the rheology control agent falls as the electrical conductivity becomes lower. Consequently, on adjusting to a viscosity which is suitable for spraying, the solid fraction is very high, and the distribution properties of the aluminium pigment (the metallic appearance) become poor. The painted appearance in Illustrative Examples 1 and 2 was excellent.

TABLE 2

|  |  | Example 1 | Example 2 | Example 3 | Example 4 |
|---|---|---|---|---|---|
| MF-D Value *1 | Before Storage | 75.8 | 76.8 | 75.2 | 62.3 |
|  | After Storage | 56.7 | 76.4 | 35.9 | 51.4 |
| IV Value *2 | Before Storage | 228 | 236 | 231 | 165 |
|  | After Storage | 190 | 224 | 124 | 150 |
| Visual Appearance*3 |  | Δ | o | x | o-x |
| Run Properties*4 |  | Δ-x | o | Δ | x |
| Solid Fraction After Storage |  | 24.0% | 24.0% | 24.0% | 31.0% |
| Viscosity After Storage (DIN 4 cup) |  | 20– | 26– | 25– | 20– |

*1–*4: See Table 1

As is clear from Table 2, the painted appearance after storage was not good in Illustrative Example 3. This is because coagulation occurred during the storage of the paint. Furthermore the viscosity under high shear and low shear after storage was markedly reduced. Consequently runs were produced on painting. The change in the viscosity after storage was small in Illustrative Example 4 but the painted appearance was poor after storage in the same way as before storage.

On the other hand, in Illustrative Example 2 a good finished appearance was seen after storage in the same way as before storage. Furthermore, there was virtually no change in the viscosity under high shear and under low shear. In Illustrative Example 1 there was a small change in the viscosity on storage and so the painted appearance was rather poor when compared with that in Illustrative Example 2, but it was good when compared with that in Illustrative Example 3 or Illustrative Example 4.

We claim:

1. A method of forming multi-layer paint films wherein a multi-layer paint film is formed on a substrate comprising:

A) applying to the substrate a base coat composition which is aqueous and which contains pigment;

B) forming a paint film of the composition which has been applied in A);

C) applying a transparent top coat over the base coat paint film of (B); and

D) baking the base coat and the top coat at the same time;

wherein the base coat composition comprises (a.) an aqueous polyurethane resin having a solid fraction, wherein the aqueous polyurethane resin has structural units represented by the general formula (1) indicated below and is dispersed in water:

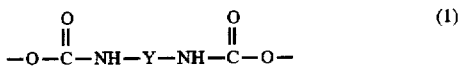

in this formula, Y represents an aromatic, aliphatic or alicyclic hydrocarbyl group and (b.) an inorganic rheology control agent of which a 3% by weight aqueous solution exhibits an electrical conductivity of 700–900 µS/cm.

2. The method of claim 1 wherein the base coat composition applied further comprises from 1–80% by weight of an aqueous melamine resin based on the weight of the solid fraction of the polyurethane resin.

3. The method of claim 2 wherein the base coat composition applied comprises a binder selected from the group consisting of polyester resin, acrylic resin and mixtures thereof, and the ratio by weight of aqueous melamine resin to binder is 2:1–1:4, and the total amount of melamine resin, polyester resin and/or acrylic resin is 1–80% by weight based on the total weight of the solid fraction of the polyurethane resin.

4. The method of claim 1 wherein the base coat composition applied further comprises the inorganic rheology control agent in an amount of from 0.5 to 10% by weight, based on total weight of the base coat composition.

5. The method of claim 4 wherein the base coat composition applied comprises the inorganic rheology control agent in an amount of 0.5–2% by weight, with respect to the total weight of the base coat composition.

6. The method of claim 1 wherein a 3% aqueous solution of the inorganic rheology control agent exhibits an electrical conductivity of 700–780 µS/cm.

7. The method of claim 4 wherein the base coat composition applied comprises sodium magnesium silicate as the inorganic rheology control agent.

8. The method of claim 1 wherein the base coat composition further comprises 0.5–25% by weight of pigment selected from the group consisting of metallic pigments, effect pigments and mixtures thereof.

9. The method of claim 1 wherein the base coat composition has a pH value of between 6 and 9.

10. The method of claim 9 wherein the base coat composition has a pH value of between 7.5 and 8.5.

11. The method of claim 1 wherein the multi-layer paint film is formed on a plastic substrate.

12. A basecoat composition comprising (a.) an aqueous polyurethane resin having a solid fraction, wherein the aqueous polyurethane resin has structural units represented by the general formula (1) indicated below and is dispersed in water:

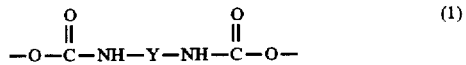

in this formula, Y represents an aromatic, aliphatic or alicyclic hydrocarbyl group, and (b.) an inorganic rheology control agent of which a 3% by weight aqueous solution exhibits an electrical conductivity of 700–900 µS/cm.

13. The base coat composition of claim 12 further comprising from 1–80% by weight of an aqueous melamine resin based on the weight of the solid fraction of the polyurethane resin.

14. The base coat composition of claim 13 comprising a binder selected from the group consisting of polyester resin, acrylic resin and mixtures thereof, and the ratio by weight of the aqueous melamine resin to binder 2:1–1:4, and the total amount of aqueous melamine resin, polyester resin and/or acrylic resin is 1–80% by weight based on the total weight of the solid fraction of the polyurethane resin.

15. The base coat composition of claim 12 further comprising the inorganic rheology control agent in an amount of from 0.5 to 10% by weight, based on total weight of the base coat composition.

16. The base coat composition of claim 15 wherein the inorganic rheology control agent is present in an amount of 0.5–2% by weight, with respect to the total weight of the base coat composition.

17. The base coat composition of claim 12 wherein a 3% aqueous solution of the inorganic rheology control agent exhibits an electrical conductivity of 700–780 µS/cm.

18. The base coat composition of claim 12 wherein the inorganic rheology control agent comprises sodium magnesium silicate.

19. The base coat composition of claim 12 further comprising 0.5–25% by weight of pigment selected from the group consisting of metallic pigments, effect pigments and mixtures thereof.

20. The base coat composition of claim 12 wherein the composition has a pH value of between 6 and 9.

21. The base coat composition of claim 12 wherein the composition has a pH value of between 7.5 and 8.5.

22. The method of claim 1 wherein the transparent top coat is an aqueous top coat or a powder top coat.

* * * * *